US010565457B2

(12) United States Patent
Luo et al.

(10) Patent No.: US 10,565,457 B2
(45) Date of Patent: Feb. 18, 2020

(54) FEATURE MATCHING AND CORRESPONDENCE REFINEMENT AND 3D SUBMAP POSITION REFINEMENT SYSTEM AND METHOD FOR CENTIMETER PRECISION LOCALIZATION USING CAMERA-BASED SUBMAP AND LIDAR-BASED GLOBAL MAP

(71) Applicant: TUSIMPLE, INC., San Diego, CA (US)

(72) Inventors: Yi Luo, San Diego, CA (US); Yi Wang, San Diego, CA (US); Ke Xu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 191 days.

(21) Appl. No.: 15/684,389

(22) Filed: Aug. 23, 2017

(65) Prior Publication Data

US 2019/0065863 A1 Feb. 28, 2019

(51) Int. Cl.
*G06K 9/00* (2006.01)
*G06K 9/62* (2006.01)
*G06K 9/46* (2006.01)
*G01S 17/02* (2020.01)
*G01S 17/89* (2020.01)
(Continued)

(52) U.S. Cl.
CPC ....... *G06K 9/00791* (2013.01); *G01C 21/165* (2013.01); *G01S 17/023* (2013.01); *G01S 17/89* (2013.01); *G06K 9/46* (2013.01); *G06K 9/6267* (2013.01); *G06T 17/05* (2013.01)

(58) Field of Classification Search
CPC ............. G06K 9/00791; G06K 9/6211; G06K 9/6277; G06K 9/6267; G06K 9/46; G01C 21/165; G01S 17/023; G01S 17/89; G06T 17/05
See application file for complete search history.

(56) References Cited

U.S. PATENT DOCUMENTS

2017/0301104 A1* 10/2017 Qian .................. G06T 7/70
2018/0373980 A1* 12/2018 Huval ................ G06N 3/08

OTHER PUBLICATIONS

Carle et al ["Global Rover Localization by Matching Lidar and Orbital 3D Maps"], 2010.*

(Continued)

*Primary Examiner* — Phuoc Tran
(74) *Attorney, Agent, or Firm* — Perkins Coie LLP

(57) ABSTRACT

A method of localization for a non-transitory computer readable storage medium storing one or more programs is disclosed. The one or more programs comprise instructions, which when executed by a computing device, cause the computing device to perform by one or more autonomous vehicle driving modules execution of processing of images from a camera and data from a LiDAR using the following steps comprising: computing, in response to features from a 3D submap and features from a global map, matching score between corresponding features of a same class between the 3D submap and the global map; selecting, for each feature in the 3D submap, a corresponding feature with the highest matching score from the global map; determining a feature correspondence to be invalid if a distance between corresponding features is larger than a threshold; and removing the invalid feature correspondence.

20 Claims, 7 Drawing Sheets

(51) Int. Cl.
*G01C 21/16* (2006.01)
*G06T 17/05* (2011.01)

(56) References Cited

OTHER PUBLICATIONS

Caselitz et al., Monocular Camera Localization in 3D LiDAR Maps, Germany.
Mur-Artal et al., ORB-SLAM: A Versatile and Accurate Monocular SLAM System, IEEE Transactions on Robotics, Oct. 2015, pp. 1147-1163, vol. 31, No. 5, Spain.
Sattler et al., Are Large-Scale 3D Models Really Necessary for Accurate Visual Localization?, CVPR, IEEE, 2017, pp. 1-10.
Engel et al., LSD-SLAM: Large-Scale Direct Monocular SLAM, pp. 1-16, Munich.

* cited by examiner

FEATURE MATCHING AND CORRESPONDENCE REFINEMENT AND 3D SUBMAP POSITION REFINEMENT SYSTEM AND METHOD FOR CENTIMETER PRECISION LOCALIZATION USING CAMERA-BASED SUBMAP AND LIDAR-BASED GLOBAL MAP

PRIORITY/RELATED DOCUMENTS

This patent application incorporates by reference in their entireties the following co-pending patent applications filed on Aug. 23, 2017, including the following: (1) U.S. patent application Ser. No. 15/684,339, issued as U.S. Pat. No. 10,223,806, entitled "System and Method for Centimeter Precision Localization Using Camera-Based Submap and LiDAR-Based Global Map," (2) U.S. patent application Ser. No. 15/684,363, entitled "3D Submap Reconstruction System and Method for Centimeter Precision Localization Using Camera-Based Submap and LiDAR-Based Global Map," and (3) U.S. patent application Ser. No. 15/684,414, issued as U.S. Pat. No. 10,223,807 entitled "Feature Extraction from 3D Submap and Global Map System and Method for Centimeter Precision Localization Using Camera-Based Submap and LiDAR-Based Global Map," and all with the same inventor(s).

FIELD OF THE DISCLOSURE

The field of the disclosure is in general related to autonomous vehicles and, in particular, to a system and a method for localization using a camera-based reconstructed submap and a LiDAR-based global map.

BACKGROUND OF THE DISCLOSURE

Intelligent or autonomous vehicle is increasingly popular and has recently become a research topic of interest. In autonomous vehicle applications, robust and smooth localization in a large scale outdoor environment is a key problem. For land-based ground vehicle such as an autonomous car which operates in outdoor environment, the most prevalent sensor for localization information is global positioning system (GPS). However, as a commonly known problem, GPS satellite signal is not always available in urban environments and its accuracy is also compromised due to multi-path errors caused by, for example, high city buildings and tree canopies. Therefore, simultaneous localization and mapping (SLAM) based approaches have been increasingly developed to build a map for urban applications. Such approaches aid the inertial navigation by modeling the map and using on-board sensors to localize relative to that map.

All referenced patents, applications and literatures throughout this disclosure are incorporated herein by reference in their entirety. For example, including the following references:

Tim Caselitz, Bastian Stetler, Michael Ruhnke, Wolfram Burgard; *Monocular Camera Localization in 3 D LiDAR Maps*; ais.informatik.unifreiburge/publications/papers/caselitz16iros.pdf.

Raul Mur-Attal, J. M. M. Montiel, Member, IEEE, and Juan D. Tardos, Member IEEE; *ORB-SLAM: A Versatile and Accurate Monocular SLAM System*, IEEE Transactions on Robotics, Vol. 31, No. 5, October 2015, 1147-1163.

Torsten Sattler, Akihiko Torii, Josef Sivic, March Pollefeys, Hajime Taira, Masatoshi Okutomi, Tomas Pajdla, Department of Computer Science, E T D Zurich, Tokyo Institute of Technology, Iniria, Microsoft, Redmond, Chezeh Technology University in Prague, *Are Large-Scale 3 D Models Really Necessary For Accurate Visual Localization*; hal.inria.fr/hal01513083.

Jakob Engel and Thomas Schops and Daniel Cremers, Technical University Munich; *LSD-SLAM: Large Scale Direct Monocular SLAM*; researchgate.net/publication/290620817_LSD-SLAM large-scale direct monocular SLAM

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of localization for a non-transitory computer readable storage medium storing one or more programs. The one or more programs comprise instructions, which when executed by a computing device, cause the computing device to perform by one or more autonomous vehicle driving modules execution of processing of images from a camera and data from a LiDAR using the following steps comprising: computing, in response to features from a 3D submap and features from a global map, matching score between corresponding features of a same class between the 3D submap and the global map; selecting, for each feature in the 3D submap, a corresponding feature with the highest matching score from the global map; determining a feature correspondence to be invalid if a distance between corresponding features is larger than a threshold; and removing the invalid feature correspondence.

In an embodiment, before computing matching score, the method further comprises: performing data alignment; and collecting the data in an environment by using sensors including a camera, the LiDAR and an inertial navigation module.

In another embodiment, before computing matching score, the method further comprises: constructing at least one 3D submap; and constructing a global map.

In yet another embodiment, constructing at least one 3D submap comprises: obtaining images from a camera; and constructing at least one 3D submap based on the images, using visual SLAM.

In still another embodiment, constructing a global map comprises: obtaining the data from the LiDAR; and constructing a city-scale 3D map based on the data from the LiDAR, using LiDAR mapping.

In yet still another embodiment, before computing matching score, the method further comprises: extracting features from the 3D submap and the global map.

In still yet another embodiment, extracting features from the 3D submap and the global map comprises: extracting structured features and unstructured features from 3D submap and the global map.

In a further embodiment, the structured features include at least one of planes, straight lines and curved lines, and the unstructured features include sparse 3D points.

In another further embodiment, extracting features from the 3D submap and the global map comprises: voxelizing the 3D submap and the global map into voxels; and estimating distribution of 3D points within the voxels, using a probabilistic model.

In yet another further embodiment, extracting features from the 3D submap and the global map comprises: classifying the extracted features into classes.

In still another further embodiment, the distance between corresponding features is determined by a trained classifier.

In yet still another further embodiment, the method further comprises: refining location of the 3D submap.

In still yet another further embodiment, refining location of the 3D submap comprises: performing an iterative estimation of location of the 3D submap until distance between corresponding features reaches a predetermined value.

Embodiments of the present disclosure also provide a system for localization. The system comprises an internet server, comprising: an I/O port, configured to transmit and receive electrical signals to and from a client device; a memory; one or more processing units; and one or more programs stored in the memory and configured for execution by the one or more processing units, the one or more programs including instructions by one or more autonomous vehicle driving modules execution of processing of images from a camera and data from a LiDAR using for: computing, in response to features from a 3D submap and features from a global map, matching score between corresponding features of a same class between the 3D submap and the global map; selecting, for each feature in the 3D submap, a corresponding feature with the highest matching score from the global map; determining a feature correspondence to be invalid if a distance between corresponding features is larger than a threshold; and removing the invalid feature correspondence.

In an embodiment, before computing matching score, the system further comprises: constructing at least one 3D submap based on images from a camera, using visual SLAM; and constructing a global map based on the data from the LiDAR, using LiDAR mapping.

In another embodiment, before computing matching score, the system further comprises: extracting structured features and unstructured features from 3D submap and the global map.

In still another embodiment, extracting features from the 3D submap and the global map comprises: voxelizing the 3D submap and the global map into voxels; and estimating distribution of 3D points within the voxels, using a probabilistic model.

In yet another embodiment, extracting features from the 3D submap and the global map comprises: classifying the extracted features into classes.

In still yet another embodiment, the system further comprises: refining location of the 3D submap.

In yet still another embodiment, refining location of the 3D submap comprises: performing an iterative estimation of location of the 3D submap until distance between corresponding features reaches a predetermined value.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
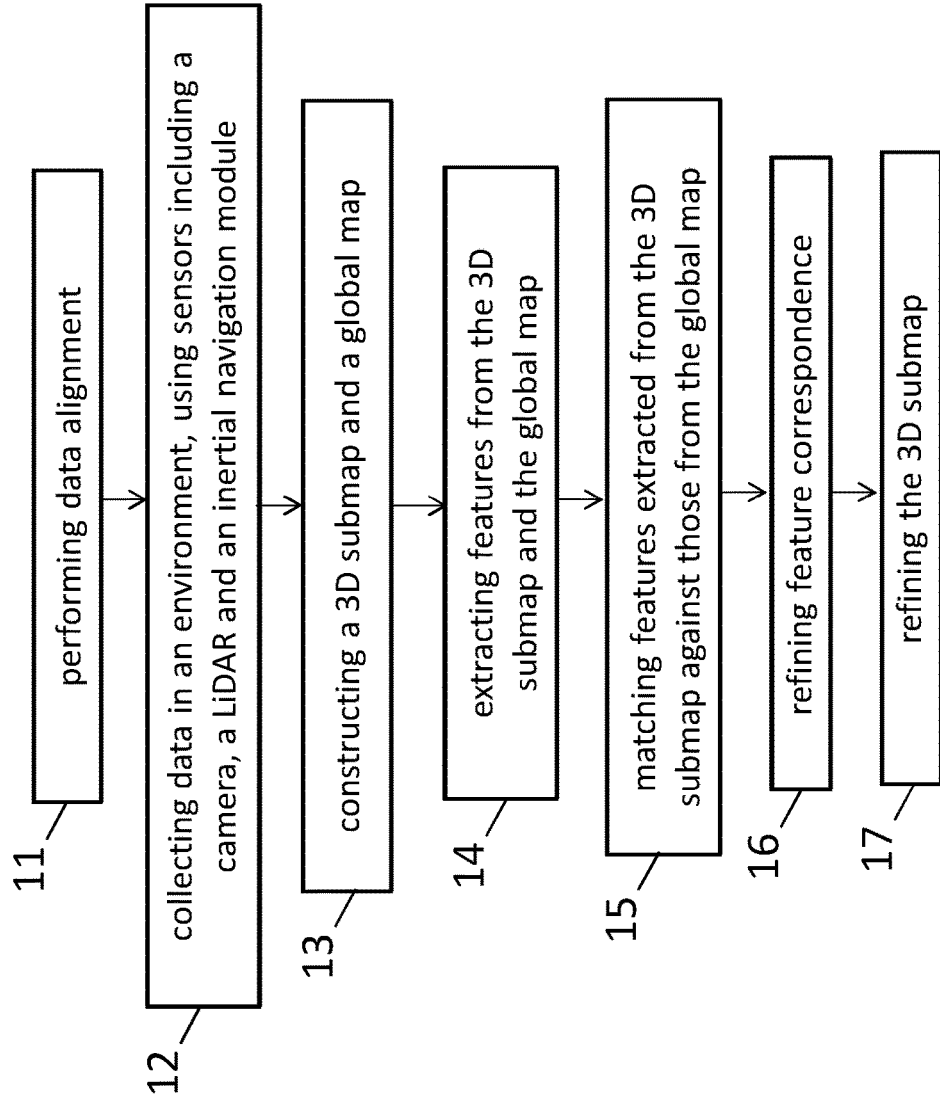
FIG. 1 is a flow diagram showing a method of localization, in accordance with some embodiments.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

FIG. 1 is a flow diagram showing a method 10 of localization, in accordance with some embodiments.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Figure 6:
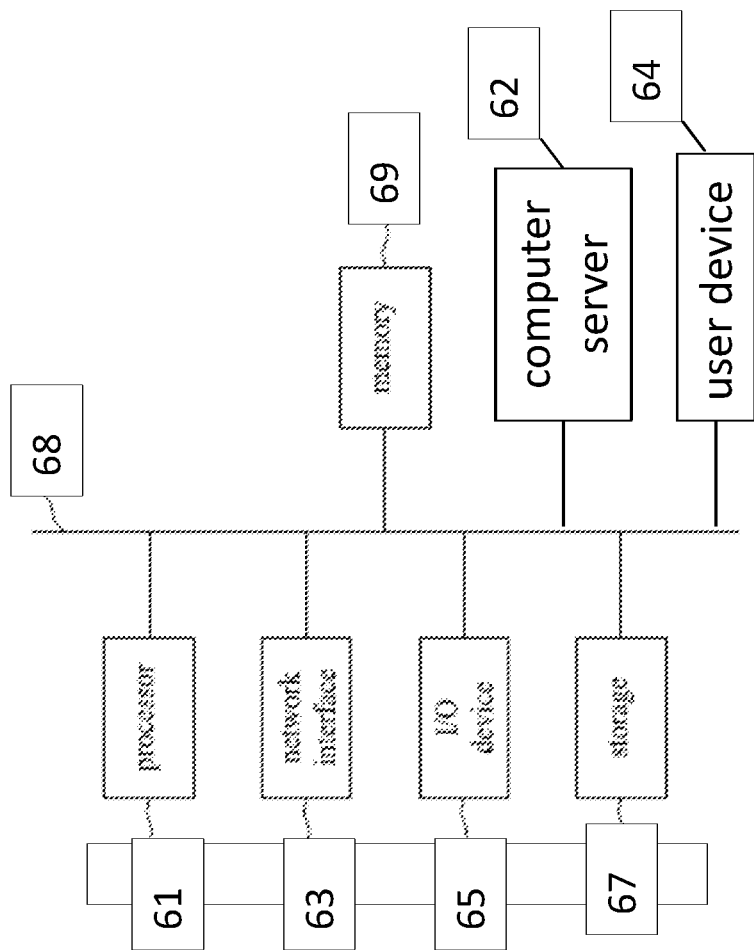
FIG. 6 is a block diagram of a system for localization, in accordance with some embodiments.

In some embodiments, as illustrated in FIG. 6, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a user device 64 (see FIG. 6). For example, the user device 64 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

In particular, referring to FIG. 1, in operation 11, data alignment, which includes sensor calibration and time synchronization, is performed. A vehicle is equipped with multiple complementary sensors which require calibration in order to represent sensed information in a common coordinate system. In an embodiment, sensors employed in the method include a light detection and ranging (LiDAR) sensor, a camera and an inertial navigation module. The LiDAR sensor and the cameras are mounted on the roof of the vehicle. LiDAR sensors have become increasingly common in both industrial and robotic applications. LiDAR sensors are particularly desirable for their direct distance measurements and high accuracy. In an embodiment according to the present disclosure, the LiDAR sensor is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM).

The inertial navigation module in an embodiment according to the present disclosure includes a global navigation satellite system (GNSS)-inertial measurement unit (IMU). The GNSS satellite signals are used to correct or calibrate a solution from the IMU. The benefits of using GNSS with an IMU are that the IMU may be calibrated by the GNSS signals and that the IMU can provide position and angle updates at a quicker rate than GNSS. For high dynamic vehicles, IMU fills in the gaps between GNSS positions. Additionally, GNSS may lose its signal and the IMU can continue to compute the position and angle during the period of lost GNSS signal. The two systems are complementary and are often employed together.

Transformation between the inertial navigation module and LiDAR coordinate is achieved by a method similar to that described in "*Unsupervised Calibration for Multi-beam Lasers*" by Levinson, Jesse and Sebastian Thrun, Experimental Robotics, Springer Berlin Heidelberg, 2014. In some embodiments according to the present disclosure, the intrinsic parameters of each beam are calibrated in advance using a supervised method. Also, LiDAR scans are collected in the form of sweep. A sweep is defined as a scan coverage of the LiDAR sensor rotating from 0 degree to 360 degrees. Moreover, motion distortion within the sweep is corrected assuming that the angular and linear velocity of the LiDAR motion is constant.

The transformation between the inertial navigation module and LiDAR coordinate is briefly discussed as follows. In the case of a multi-beam LiDAR, extrinsic calibration considers the mounting location of the entire unit relative to the vehicle's own coordinate frame, while intrinsic calibration considers the configuration of each individual beam inside the unit. In an embodiment according to the present disclosure, an unsupervised method is used for extrinsic calibration, and a supervised method is used for intrinsic calibration. Specifically, the intrinsic parameters of each beam are calibrated in advance using the supervised approach.

The approach for both calibrations leverages the simple observation that laser returns projected into three dimensions are not randomly distributed in space. Since the returned points are reflections off of physical surfaces, it is impossible for a properly calibrated sensor traveling a known trajectory to return a collection of accumulated points that is randomly distributed in three dimensions. As such, in some embodiments, the method 10 relies only on an assumption that points in space tend to lie on contiguous surfaces.

The location of the LiDAR sensor relative to the vehicle's coordinate frame can be expressed with an x (longitudinal), y (lateral), and z (height) offset along with roll, pitch, and yaw angles. The (0, 0, 0) reference point and reference orientation is specified by the coordinate system being used, i.e., the three dimension point and orientation that the vehicle's positioning system considers to be the origin.

It is assumed that the environment is generally static and contains some 3D features, i.e., it is not just smooth ground. In order to achieve an accurate calibration, LiDAR measurements are recorded as the vehicle transitions through a series of known poses. Global pose information is irrelevant, as there is no existing map, so only local pose information is required. Local pose data may be acquired in any number of ways, e.g. from a wheel encoder and IMU, from an integrated GPS/IMU system, or from a GPS system with real-time corrections.

Transformation between the camera and the LiDAR coordinate is calibrated using a method similar to that described in "Automatic Camera and Range Sensor Calibration Using a Single Shot" by Geiger, Andreas, et al., *Robotics and Automation (ICRA)*, 2012 IEEE International Conference on. IEEE, 2012. In some embodiments, the intrinsic parameters of the camera are calibrated in advance using a method described in "A Flexible New Technique for Camera Calibration" by Z. Zhang, *IEEE Transactions on Pattern Analysis and Machine Intelligence,* 22(11):1330-1334, 2000. In an embodiment, the camera includes a monocular camera, which is calibrated by multiple shots instead of single shot. Moreover, registration is made by minimizing reprojection error and translation norm. In another embodiment, the camera includes a stereo camera.

The transformation between the camera and the LiDAR coordinate is briefly discussed as follows. The method 10 relies on an inexpensive and simple calibration setup: Multiple printed checkerboard patterns are attached to walls and floor. As input, the method 10 requires multiple range or camera images of a single calibration target presented at different orientations, as well as the number of checkerboard rows and columns as input. The only assumption is that all sensors return either intensity or depth images and share a common field of view.

In addition to the transformation between the inertial navigation module and LiDAR coordinate and the transformation between the camera and the LiDAR coordinate, time synchronization among the LiDAR sensor, camera and inertial navigation module is achieved. Specifically, time synchronization between the LiDAR sensor and the inertial navigation module, between the inertial navigation module and the camera, and between the LiDAR sensor and the camera is achieved. In an embodiment, data acquisition of the camera and the LiDAR sensor are synchronized by a trigger metric.

After data alignment is performed, in operation 12, these sensors are used to collect data in an environment. In an embodiment, images of the environment are captured by the camera in approximately 30 Hz. LiDAR scans are collected in the form of a sweep in approximately 20 Hz. Vehicle poses, including position and orientation, are collected in an "east north up" (ENU) coordinate by the inertial navigation module in approximately 50 Hz.

In operation 13, a three-dimensional (3D) submap and a global map are constructed. In an embodiment, the 3D submap is constructed, based on images from the camera, using visual SLAM. Reference of visual SLAM can be made to, for example, "ORB-SLAM: a versatile and accurate monocular SLAM system" by Raul Mur-Artal et al., IEEE Transactions on Robotics 31.5 (2015): 1147-1163, or to "LSD-SLAM: Large-scale direct monocular SLAM" by Jakob Engel et al., European Conference on Computer Vision, Springer International Publishing, 2014. Further, in an embodiment, the global map is constructed, based on data from the LiDAR, using LiDAR mapping. The global map includes a 3D city-scale map.

In operation 14, features from the 3D submap and the global map are extracted. In an embodiment, the features include structured features and unstructured features. The structured features may include, for example, planes, straight lines and curved lines, and the unstructured features may include sparse 3D points.

Next, in operation 15, the features extracted from the 3D submap are matched against the features extracted from the global map so that in operation 16 invalid feature correspondences are removed. In an embodiment, if a distance between a feature in the 3D submap and a corresponding feature in the global map is larger than a threshold, the feature in the 3D submap is determined to be an invalid feature correspondence.

Subsequently, in operation 17, location of the 3D submap is iteratively estimated until a distance between corresponding features is minimized.

As far as existing approaches are concerned, visual/LiDAR SLAM methods suffer a significant drift over long time. In addition, image retrieval methods may only achieve decimeter-level accuracy. Also, methods of localization based on 3D feature points are likely to fail in a textureless environment. In contrast, the method 10 according to the present disclosure achieves localization precision in the order of few centimeters substantially free from the above-mentioned drawbacks in some existing approaches. Details of the method 10 of localization with centimeter-level accuracy will be further discussed with reference to FIGS. 2 to 5.

Figure 2:
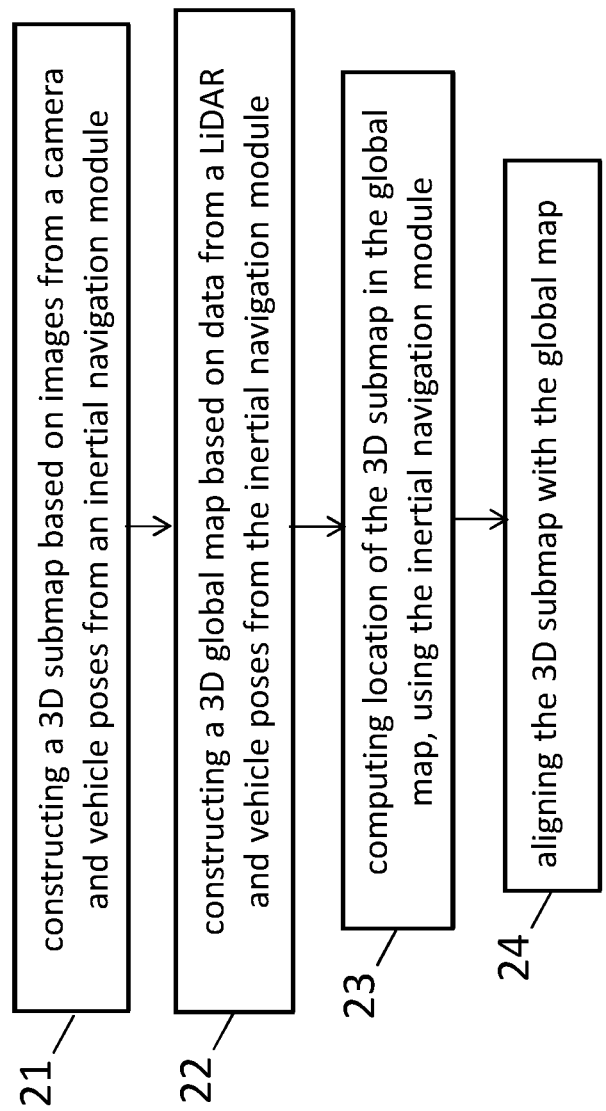
FIG. 2 is a flow diagram showing a method of localization in 3D submap reconstruction and coarse alignment, in accordance with some embodiments.

FIG. 2 is a flow diagram showing a method 20 of localization in 3D submap reconstruction and coarse alignment, in accordance with some embodiments.

Given data collected in operation 12 of FIG. 1, referring to FIG. 2, in operation 21, a 3D submap is constructed based on images from a camera and vehicle poses from an inertial navigation module. In an embodiment, the 3D submap is constructed by means of visual SLAM.

In operation 22, a 3D global map is constructed based on data from the LiDAR and vehicle poses from the inertial navigation module. The global map includes a city-scale map.

Next, in operation 23, location of the 3D submap in the global map is calculated by using the inertial navigation module. Specifically, the 3D submap's location in the global map is calculated by means of the GNSS or GPS of the inertial navigation module. In an embodiment, the 3D submap's location includes center position (latitude, longitude and altitude) of the 3D submap. In addition, a coordinate of the 3D submap, for example, a GPS coordinate, is transformed to a coordinate of the global map. As a result, a coarse location of the 3D submap in the global map is obtained.

Subsequently, in operation 24, the 3D submap is aligned with the global map. The coarse alignment in operation 24 facilitates refinement of feature correspondence, as will be further discussed.

Figure 3:
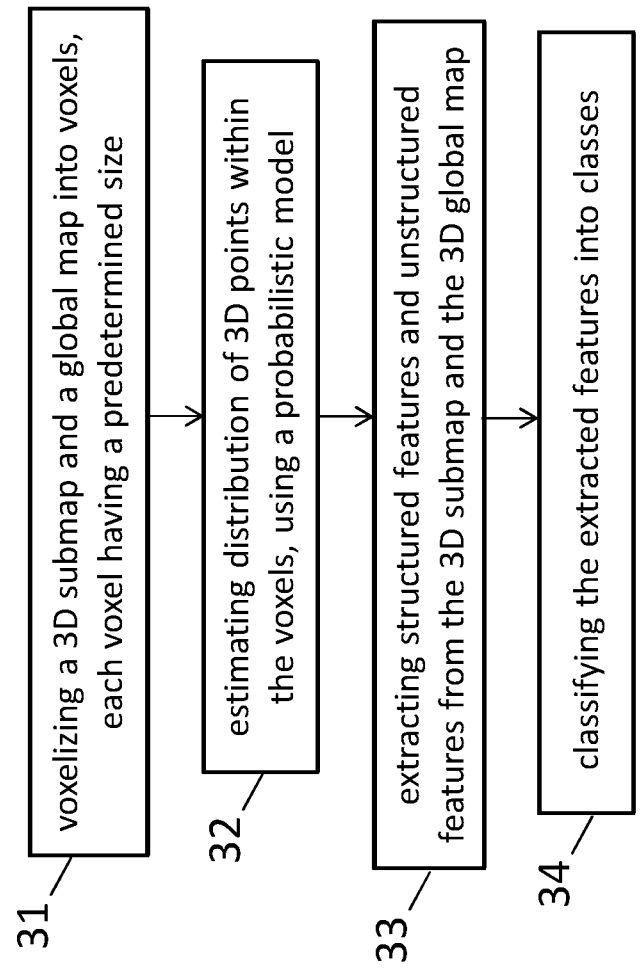
FIG. 3 is a flow diagram showing a method of localization in extracting features from a 3D submap and a global map, in accordance with some embodiments.

FIG. 3 is a flow diagram showing a method 30 of localization in extracting features from a 3D submap and a global map, in accordance with some embodiments.

After a 3D submap and a global map are constructed in operation 13 of FIG. 1, referring to FIG. 3, in operation 31, both of the 3D submap and the global map are voxelized into voxels. In an embodiment, each voxel has a predetermined size.

In operation 32, distribution of 3D points within the voxels is estimated. In an embodiment, the distribution is estimated by means of a probabilistic model.

Next, in operation 33, features are extracted from the 3D submap and the global map. The extracted features include structured features such as planes, straight lines and curved lines, and unstructured features such as sparse 3D points.

Subsequently, in operation 34, the extracted features from the 3D submap and the global map are classified into classes. Extraction and classification of features from a 3D submap and a global map facilitate feature matching, refinement of feature correspondence and refinement of submap in operations 15, 16 and 17 of FIG. 1, respectively.

Figure 4:
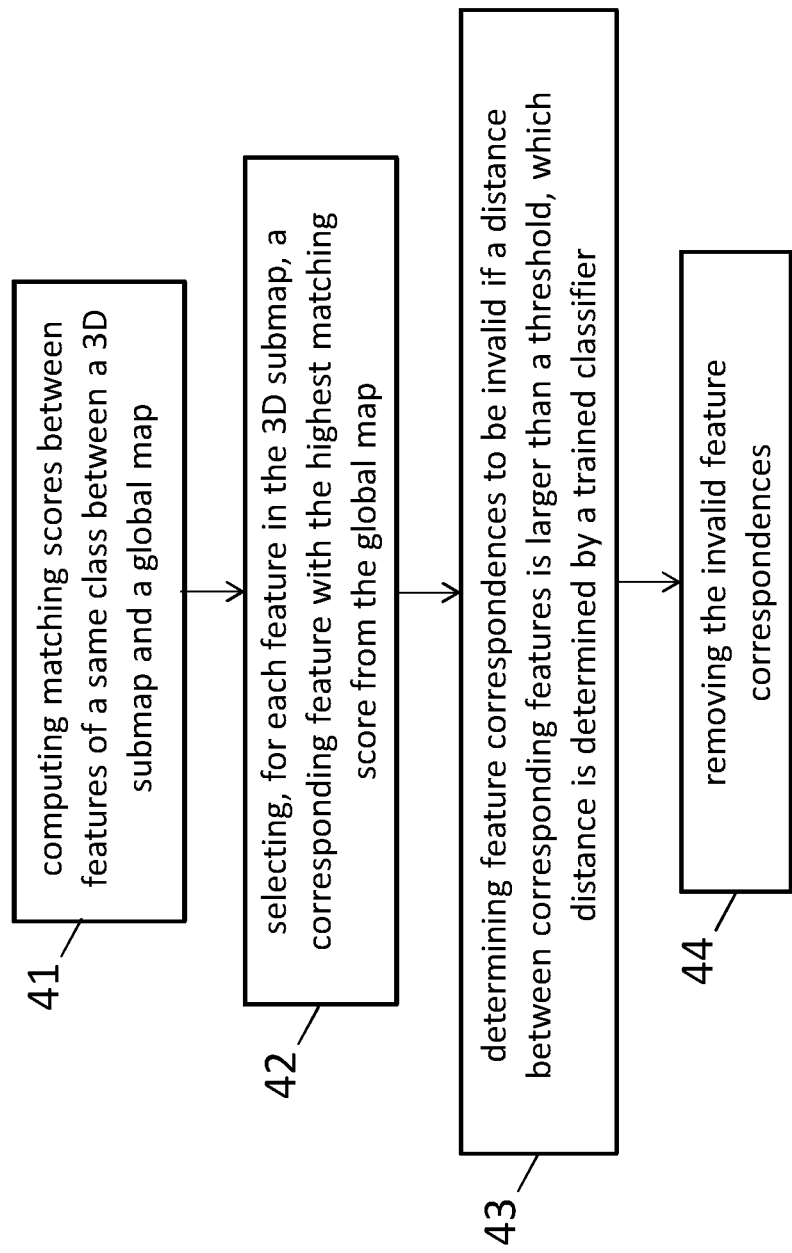
FIG. 4 is a flow diagram showing a method of localization in feature matching and feature correspondence refinement, in accordance with some embodiments.

FIG. 4 is a flow diagram showing a method 40 of localization in feature matching and feature correspondence refinement, in accordance with some embodiments.

After features from a 3D submap and a global map are extracted in operation 14 of FIG. 1, referring to FIG. 4, in operation 41, for features classified in a same class, a matching score between a feature in the 3D submap and a feature in the global map corresponding to the submap feature is computed based on the distribution of 3D points.

In operation 42, for each feature in the 3D submap, a corresponding feature in a same class with the highest matching score is selected from the global map.

Next, in operation 43, a feature correspondence is determined to be invalid if distance between corresponding features is larger than a threshold. In an embodiment, distance between corresponding features is determined by a trained classifier.

Subsequently, in operation 44, the invalid feature correspondence is filtered.

Figure 5:
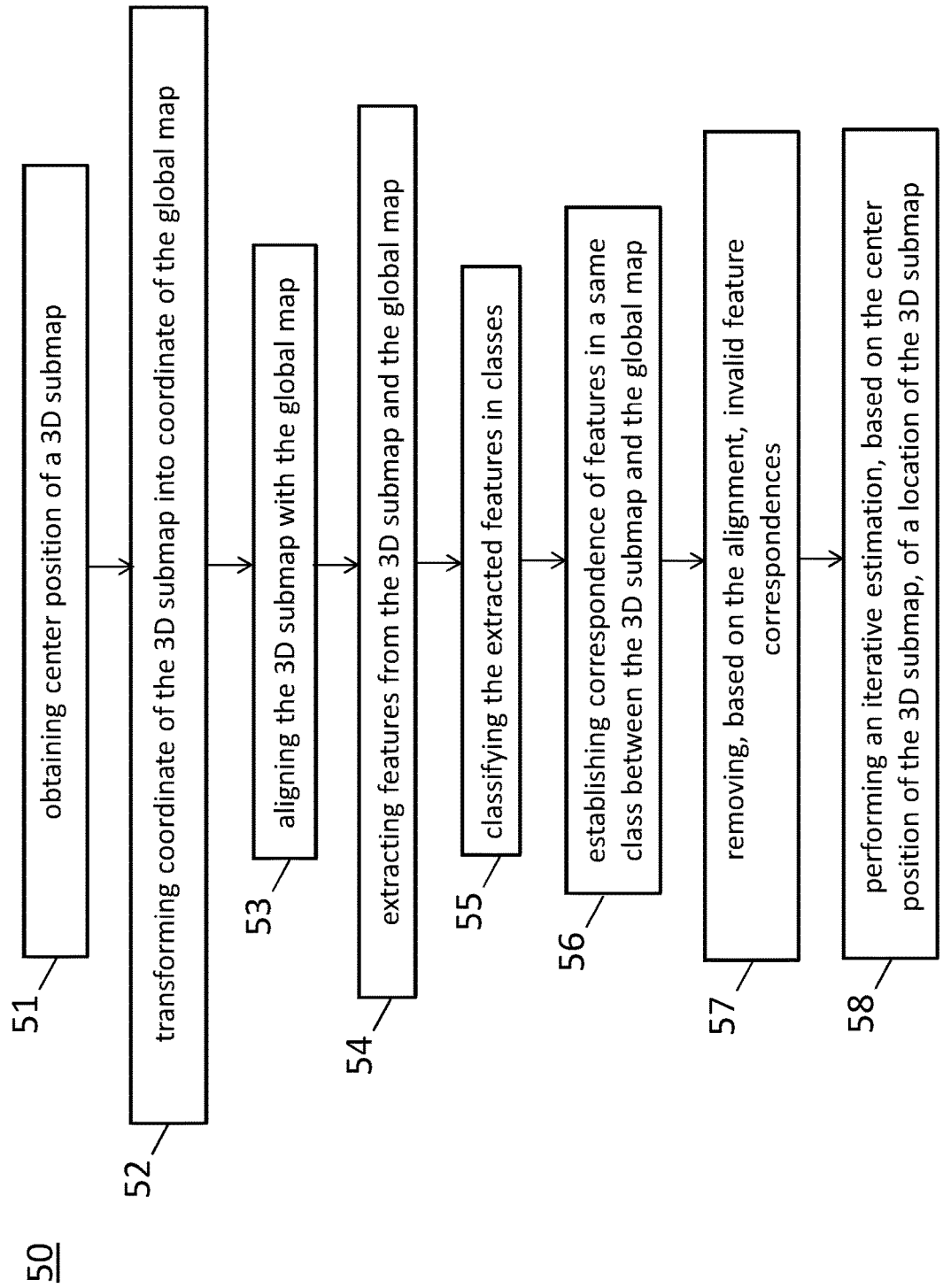
FIG. 5 is a flow diagram showing a method of localization in refining position of a 3D submap, in accordance with some embodiments.

FIG. 5 is a flow diagram showing a method 50 of localization in refining position of a 3D submap, in accordance with some embodiments.

Referring to FIG. 5, in operation 51, position of a 3D submap is obtained. In an embodiment, the position of the 3D submap includes center position (latitude, longitude and altitude) of the 3D submap.

In operation 52, coordinate of the 3D submap is transformed to coordinate of the global map.

In operation 53, the 3D submap is aligned with the global map.

In operation 54, features are extracted from the 3D submap and the global map.

In operation 55, the extracted features are classified in classes.

In operation 56, for features classified in a same class, correspondence of corresponding features between the 3D submap and the global map is established.

In operation 57, based on the alignment in operation 53, invalid feature correspondences are removed.

In operation 58, based on the position of the 3D submap in operation 51, an iterative estimation of location of the 3D submap is performed until distance between corresponding features reaches a predetermined value.

FIG. 6 is a block diagram of a system 60 for localization, in accordance with some embodiments.

Referring to FIG. 6, the system 60 includes a processor 61, a computer server 62, a network interface 63, an input and output (I/O) device 65, a storage device 67, a memory 69, and a bus or network 68. The bus 68 couples the network interface 63, the I/O device 65, the storage device 67 and the memory 69 to the processor 61.

Accordingly, the processor 61 is configured to enable the computer server 62, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 61, the computer server 62, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 62 is configured to utilize the I/O port 65 communicate with external devices via a network 68, such as a wireless network. In certain embodiments, the I/O port 65 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 62 is configured to utilize the I/O port 65 to wirelessly communicate with a client device 64, such as a mobile phone, a tablet PC, a portable laptop or any other computing device with internet connectivity. Accordingly, electrical signals are transmitted between the computer server 62 and the client device 64.

In some embodiments in accordance with the present disclosure, the computer server 62 is a virtual server capable of performing any function a regular server has. In certain embodiments, the computer server 62 is another client device of the system 60. In other words, there may not be a centralized host for the system 60, and the client devices 64 in the system are configured to communicate with each other directly. In certain embodiments, such client devices 64 communicate with each other on a peer-to-peer (P2P) basis.

The processor 61 is configured to execute program instructions that include a tool module configured to perform a method as described and illustrated with reference to FIGS. 1 to 5. Accordingly, in an embodiment in accordance with the method 10 illustrated in FIG. 1, the tool module is configured to execute the operations including: performing data alignment, analyzing data collected in an environment using sensors including a camera, a LiDAR and an inertial navigation module, constructing at least one 3D submap and a global map, extracting features from the 3D submap and the global map, matching features extracted from the 3D submap against those from the global map, refining feature correspondence and refining the 3D submap.

In an embodiment in accordance with the method 20 illustrated in FIG. 2, the tool module is configured to execute the operations including: constructing at least one 3D submap based on images from a camera and vehicle poses from an inertial navigation module, constructing a 3D global map based on data from the LiDAR and vehicle poses from the inertial navigation module, computing location of the 3D submap in the global map, using the inertial navigation module, and aligning the 3D submap with the global map.

In an embodiment in accordance with the method 30 illustrated in FIG. 3, the tool module is configured to execute the operations including: voxelizing a 3D submap and a global map into voxels, each voxel having a predetermined size, estimating distribution of 3D points within the voxels, using a probabilistic model, extracting structured features and unstructured features from the 3D submap and the 3D global map and classifying the extracted features into classes.

In an embodiment in accordance with the method 40 illustrated in FIG. 4, the tool module is configured to execute the operations including: computing, for each feature in a same class, matching scores between corresponding features between a 3D submap and a global map, selecting, for each feature in the 3D submap, a corresponding feature with the highest matching score from global map, determining feature correspondences to be invalid if a distance between corresponding features is larger than a threshold, which distance is determined by a trained classifier, and removing the invalid feature correspondences.

In an embodiment in accordance with the method 50 illustrated in FIG. 5, the tool module is configured to execute the operations including: obtaining center position of a 3D submap, transforming coordinate of the 3D submap into coordinate of the global map, aligning the 3D submap with the global map, extracting features from the 3D submap and the global map, classifying the extracted features in classes, establishing correspondence of features in a same class between the 3D submap and the global map, removing, based on the alignment, invalid feature correspondences, and performing an iterative estimation, based on the center position of the 3D submap, of a location of the 3D submap.

The network interface 63 is configured to access program instructions and data accessed by the program instructions stored remotely through a network (not shown).

The I/O device 65 includes an input device and an output device configured for enabling user interaction with the system 60. In some embodiments, the input device comprises, for example, a keyboard, a mouse, and other devices. Moreover, the output device comprises, for example, a display, a printer, and other devices.

The storage device 67 is configured for storing program instructions and data accessed by the program instructions. In some embodiments, the storage device 67 comprises, for example, a magnetic disk and an optical disk.

The memory 69 is configured to store program instructions to be executed by the processor 61 and data accessed by the program instructions. In some embodiments, memory 69 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 69 is incorporated into the processor 61.

Figure 7:
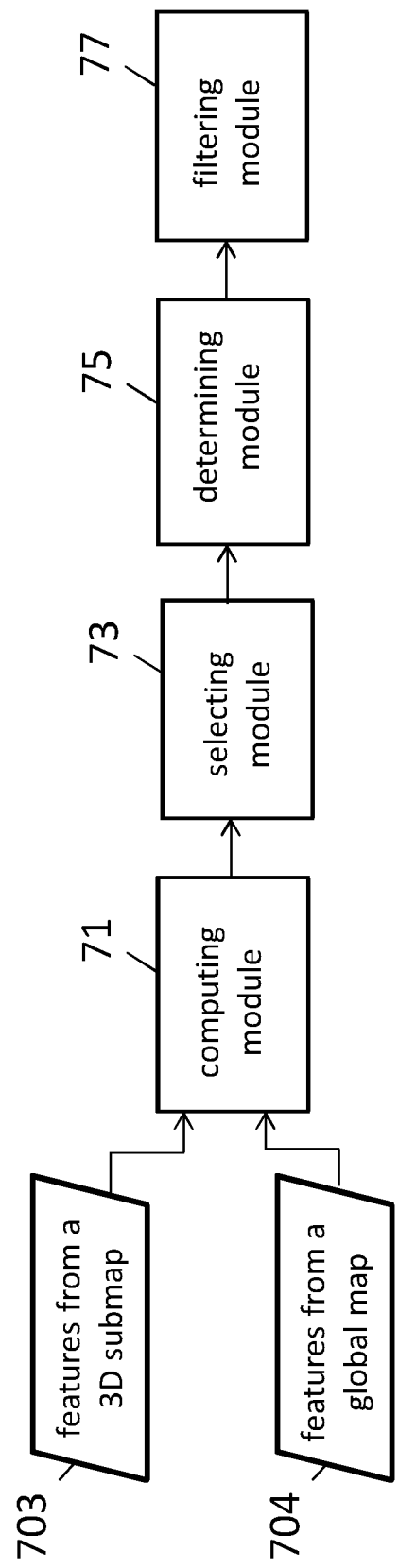
FIG. 7 is a block diagram of a processor in the system illustrated in FIG. 6 for localization, in accordance with some embodiments.

FIG. 7 is a block diagram of a processor 61 in the system 60 illustrated in FIG. 6 for localization, in accordance with some embodiments.

Referring to FIG. 7, the processor 61 includes a computing module 71, a selecting module 73, a determining module 75 and a filtering module 77. The computing module 71 is configured to, in response to features 703 extracted from a 3D submap and features 704 extracted from a global map, compute matching score between corresponding features of a same class between the 3D submap and the global map. The selecting module 73 is configured to select, for each feature in the 3D submap, a corresponding feature with the highest matching score from the global map. The determining module 75 is configured to determining a feature correspondence to be invalid if a distance between corresponding features is larger than a threshold. The filtering module 77 is configured to remove the invalid feature correspondence.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of localization comprising:
   processing of images from a camera and processing a data from a light detection and ranging (LiDAR), the processing comprising:
   extracting first features from a 3D submap, wherein the 3D submap is generated using the images from the camera;
   extracting second features from a global map, wherein the global map is generated from the data from the LiDAR,
   generating matching scores from comparing the first features to the second features, wherein each matching score represents a correspondence between one of the first features and one of the second features, and wherein each matching score includes a distance between the one of the first features and the one of the second features; and
   removing one or more correspondences between the first features and the second features for one or more matching scores that are larger than a threshold value.

2. The method according to claim 1, wherein before computing the matching score, the processing of the images further comprises:
   performing alignment of the data; and
   collecting the data in an environment by using sensors including the camera, the LiDAR, and an inertial navigation module.

3. The method according to claim 1, wherein before computing the matching score, the processing of the images further comprises:
   constructing at least one 3D submap including the 3D submap; and
   constructing a global map.

4. The method according to claim 3, wherein the constructing the at least one 3D submap including the 3D submap comprises:
   obtaining the images from the camera; and
   constructing the at least one 3D submap including the 3D submap based on the images using visual simultaneous localization and mapping (SLAM).

5. The method according to claim 3, wherein the constructing the global map comprises:
   obtaining the data from the LiDAR; and
   constructing a city-scale 3D map based on the data from the LiDAR using LiDAR mapping.

6. The method according to claim 3, wherein before computing the matching score, the processing of the images further comprises:
   extracting features from the 3D submap and the global map.

7. The method according to claim 6, wherein the extracting the first features from the 3D submap and the extracting the second features from the global map comprises:
   extracting structured features and unstructured features from the 3D submap and the global map.

8. The method according to claim 7, wherein the structured features include at least one of planes, straight lines, and curved lines, and the unstructured features include sparse 3D points.

9. The method according to claim 6, wherein the extracting the first features from the 3D submap and the extracting the second features from global map comprises:
   voxelizing the 3D submap and the global map into voxels; and
   estimating a distribution of 3D points within the voxels using a probabilistic model.

10. The method according to claim 6, wherein the extracting the first features from the 3D submap and the extracting the second features from the global map comprises:
    classifying the extracted features into classes.

11. The method according to claim 1, wherein the distance between corresponding features is determined by a trained classifier.

12. The method according to claim 1 further comprising:
    refining a location of the 3D submap, wherein the refining the location of the 3D submap comprises performing an iterative estimation of the location of the 3D submap until a first distance between corresponding features reaches a predetermined value.

13. A system for localization, the system comprising:
an internet server, comprising:
- an I/O port, configured to transmit and receive electrical signals to and from a client device;
- a memory;
- one or more processing units; and
- one or more programs stored in the memory, the one or more programs configured to cause the one or more processing units to perform at least:
  - processing of images from a camera and processing data from a light detection and ranging (LiDAR), the processing comprising:
    - computing, in response to features from a 3D submap and features from a global map, matching scores between corresponding features of a same class within the 3D submap and the global map;
    - selecting, for each feature in the 3D submap, one of the corresponding features with a highest matching score from the global map;
    - determining a correspondence is invalid because a distance between the corresponding features is larger than a threshold;
    - removing the invalid correspondence; and
    - refining a location of the 3D submap, wherein the refining the location of the 3D submap comprises performing an iterative estimation of the location of the 3D submap until a first distance between corresponding features reaches a predetermined value.

14. The system according to claim 13, wherein before computing the matching score, the processing of the images further comprises:
- constructing at least one 3D submap including the 3D submap based on the images from the camera using visual simultaneous localization and mapping (SLAM); and
- constructing the global map based on the data from the LiDAR using LiDAR mapping.

15. The system according to claim 14, wherein before computing the matching score, the processing of the images further comprises:
- extracting structured features and unstructured features from the 3D submap and the global map.

16. The system according to claim 15, wherein the extracting the features from the 3D submap and the global map comprises:
- voxelizing the 3D submap and the global map into voxels; and
- estimating a distribution of 3D points within the voxels using a probabilistic model.

17. The system according to claim 15, wherein the extracting the features from the 3D submap and the global map comprises:
- classifying the extracted features into classes.

18. A method of localization, comprising:
processing images from a camera and processing data from a light detection and ranging (LiDAR), the processing comprising:
- computing, in response to features from a 3D submap and features from a global map, matching scores between corresponding features of a same class within the 3D submap and the global map;
- selecting, for each feature in the 3D submap, one of the corresponding features with a highest matching score from the global map;
- determining a correspondence is invalid because a distance between the corresponding features is larger than a threshold;
- removing the invalid correspondence; and
- refining a location of the 3D submap, wherein the refining the location of the 3D submap comprises performing an iterative estimation of the location of the 3D submap until a first distance between corresponding features reaches a predetermined value.

19. The method according to claim 18, wherein before computing the matching scores, the processing of the images further comprises:
- constructing at least one 3D submap including the 3D submap based on the images from the camera using visual simultaneous localization and mapping (SLAM); and
- constructing the global map based on the data from the LiDAR using LiDAR mapping.

20. The method according to claim 19, wherein before computing the matching score, the processing of the images further comprises:
- extracting structured features and unstructured features from the 3D submap and the global map.

* * * * *